(12) United States Patent
Miyanaga et al.

(10) Patent No.: US 11,480,507 B2
(45) Date of Patent: Oct. 25, 2022

(54) POWDER RESIN FLOW INSPECTION METHOD AND POWDER RESIN FLOW INSPECTION APPARATUS

(71) Applicant: HONDA MOTOR CO., LTD., Tokyo (JP)

(72) Inventors: Kenji Miyanaga, Tochigi-ken (JP); Hiroshi Kunieda, Tochigi-ken (JP); Yosuke Suzuki, Tochigi-ken (JP); Naofumi Sugai, Tochigi-ken (JP); Takao Endo, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 301 days.

(21) Appl. No.: 16/824,881

(22) Filed: Mar. 20, 2020

(65) Prior Publication Data
US 2020/0300741 A1    Sep. 24, 2020

(30) Foreign Application Priority Data

Mar. 22, 2019   (JP) .............................. JP2019-054950
Mar. 12, 2020   (JP) .............................. JP2020-042587

(51) Int. Cl.
*G01N 11/14*    (2006.01)
*B05D 1/24*     (2006.01)
(Continued)

(52) U.S. Cl.
CPC .............. *G01N 11/14* (2013.01); *B05C 19/02* (2013.01); *B05D 1/24* (2013.01); *G01N 11/00* (2013.01); *B05D 3/0218* (2013.01)

(58) Field of Classification Search
CPC ......... G01N 11/10; G01N 11/14; G01N 11/16
See application file for complete search history.

(56) References Cited

U.S. PATENT DOCUMENTS 4,181,023 A * 1/1980 Clamroth ............... G01N 11/14
                                                    73/54.23
4,310,451 A * 1/1982 Ernest .................... C08K 5/053
                                                    524/904
(Continued)

FOREIGN PATENT DOCUMENTS

EP      1750114 A3 *  1/2014   ............. G01N 11/14
JP      10-015320     7/1965
(Continued)

OTHER PUBLICATIONS

Tian Hao, "Analogous Viscosity Equations of Granular Powders Based on Eyring's Rate Process Theory and Free Volume Concept", Aug. 18, 2015. (Year: 2015).*

(Continued)

*Primary Examiner* — David A. Rogers
(74) *Attorney, Agent, or Firm* — Amin, Turocy & Watson, LLP

(57) ABSTRACT

A flow inspection method includes: a flow step of making powder resin flow in a housing portion of a flow tank; a viscosity measurement step of measuring a viscosity of the powder resin flowing in the housing portion; and a judgment step of judging whether or not an estimate of a bulk density of the powder resin flowing in the housing portion is less than or equal to a bulk density permissible value, the estimate being obtainable from a correlation, calculated in advance, between the bulk density and a viscosity of the powder resin flowing in the housing portion, and a measured value of the viscosity obtained in the viscosity measurement step.

13 Claims, 12 Drawing Sheets

(51) Int. Cl.
   *B05C 19/02*    (2006.01)
   *G01N 11/00*    (2006.01)
   *B05D 3/02*     (2006.01)

(56) References Cited

U.S. PATENT DOCUMENTS

2010/0116033 A1* 5/2010 Hoenderkamp ....... G01N 11/10
                                                    73/54.28
2014/0033803 A1* 2/2014 Ozadali ............... B01F 27/0724
                                                    73/54.28

FOREIGN PATENT DOCUMENTS

JP    2005177783 A  *  7/2005
JP    2011-235240      11/2011

OTHER PUBLICATIONS

Japanese Office Action for Japanese Patent Application No. 2020-042587 dated Sep. 21, 2021.

* cited by examiner

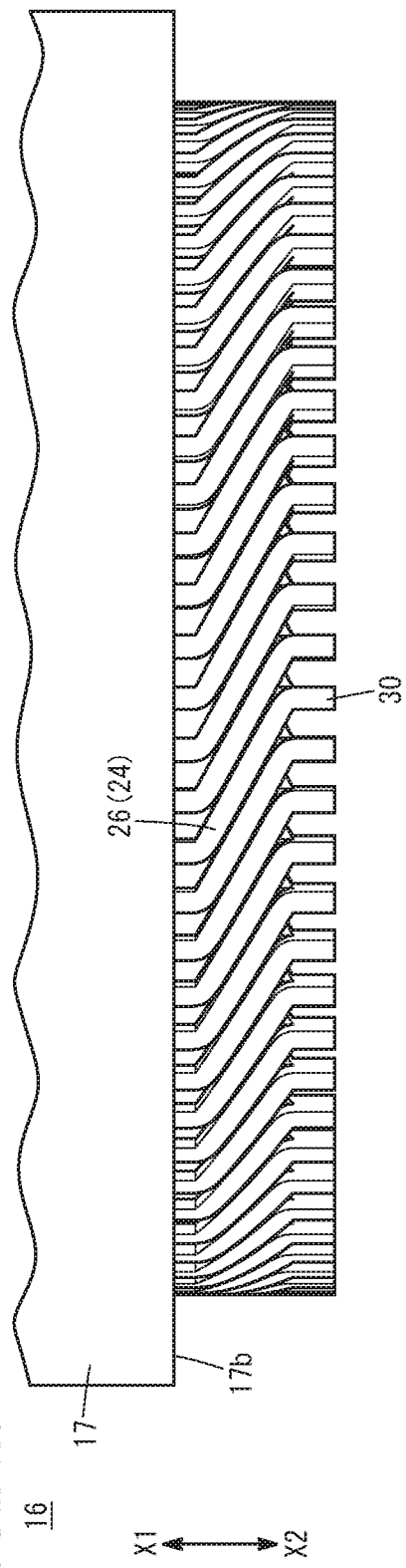
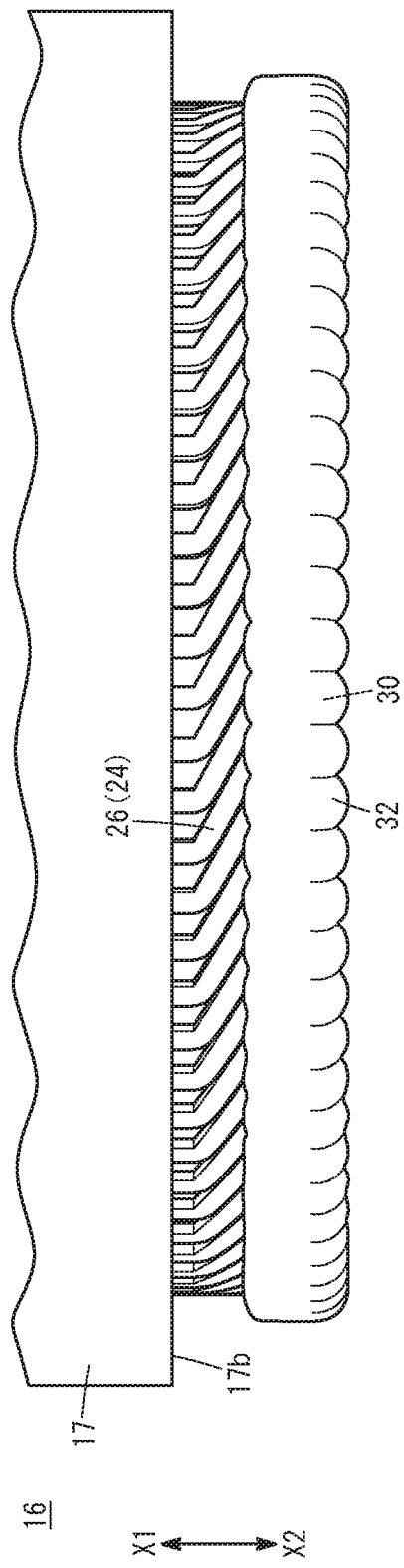

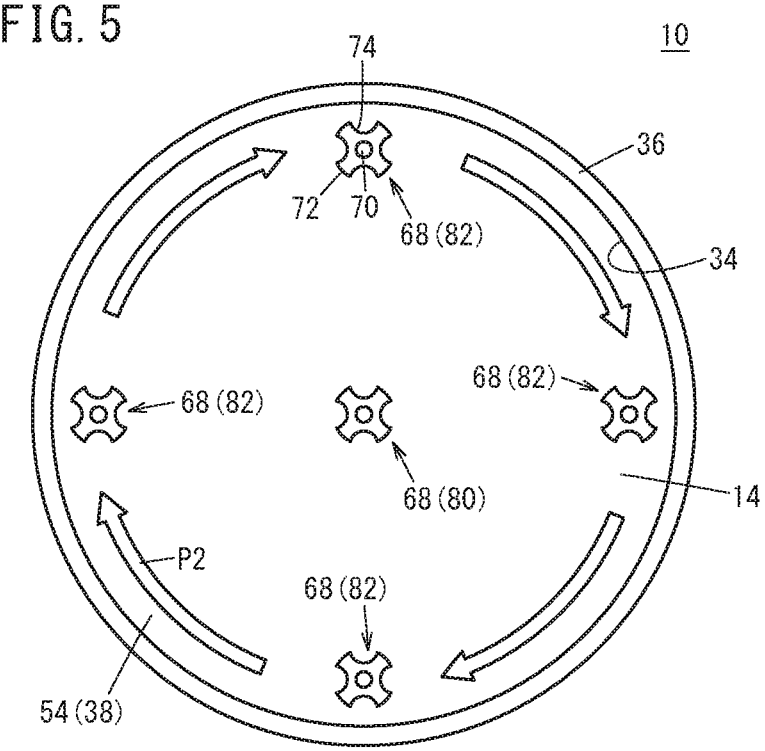

POWDER RESIN FLOW INSPECTION METHOD AND POWDER RESIN FLOW INSPECTION APPARATUS

CROSS-REFERENCE TO RELATED APPLICATION

This application is based upon and claims the benefit of priority from Japanese Patent Applications No. 2019-054950 filed on Mar. 22, 2019 and No. 2020-042587 filed on Mar. 12, 2020, the contents of which are incorporated herein by reference.

BACKGROUND OF THE INVENTION

Field of the Invention

The present invention relates to a powder resin flow inspection method and a powder resin flow inspection apparatus which inspect the flow of powder resin in a flow tank that makes the powder resin flow, the powder resin being made to adhere to a portion to be coated of a heated workpiece.

Description of the Related Art

As disclosed in, for example, Japanese Laid-Open Patent Publication No. 2011-235240, there is a known flow tank that makes powder resin flow by providing a porous plate in the bottom of a housing portion which houses the powder resin and sending air to the inside of the housing portion through the pores of the porous plate and vibrating the housing portion. By immersing a portion to be coated of a heated workpiece in the powder resin flowing in the housing portion, the powder resin, which has contacted the portion to be coated, adheres (is melted and sticks) thereto by heat and forms a coating. In this way, powder coating is performed.

SUMMARY OF THE INVENTION

In this kind of flow tank, due to, for instance, conduction of heat of a heated portion to be coated to the powder resin which has not yet adhered to the portion to be coated, powder resin is sometimes melted and powders of the powder resin stick to each other, and a particle size thereby increases. When this causes a rise in the bulk density of the powder resin in a housing portion, the flowability of the powder resin relative to the amount of air supplied to the housing portion decreases. In this case, there is concern about the difficulty of efficiently forming a coating on the entire area of the portion to be coated and forming a coating of high quality. For this reason, conducting an inspection to check whether or not powder resin in a flow tank is flowing satisfactorily is needed.

The present invention has been made to solve the above-described problem and provides a powder resin flow inspection method and a powder resin flow inspection apparatus which can easily and efficiently inspect the flow of powder resin in a flow tank.

An aspect of the present invention is a powder resin flow inspection method for inspecting a flow of powder resin in a flow tank configured to make the powder resin flow, the powder resin being made to adhere to a portion to be coated of a heated workpiece. The powder resin flow inspection method includes: a flow step of housing the powder resin in a housing portion of the flow tank and making the powder resin flow by supplying air to an inside of the housing portion through pores of a porous plate provided in a bottom of the housing portion and vibrating the housing portion; a viscosity measurement step of measuring a viscosity of the powder resin flowing in the housing portion; and a judgment step of judging whether or not the powder resin is in a state in which an estimate of a bulk density of the powder resin flowing in the housing portion is less than or equal to a bulk density permissible value, the estimate being obtainable from a correlation, calculated in advance, between the bulk density and a viscosity of the powder resin flowing in the housing portion, and a measured value of the viscosity obtained in the viscosity measurement step.

Another aspect of the present invention is a powder resin flow inspection apparatus that inspects the flow of powder resin in a flow tank configured to make the powder resin flow, the powder resin being made to adhere to a portion to be coated of a heated workpiece, wherein by supplying air to an inside of a housing portion configured to house the powder resin, through pores of a porous plate provided in a bottom of the housing portion and vibrating the housing portion, the flow tank makes the powder resin housed in the housing portion flow, and the powder resin flow inspection apparatus includes: a viscosity measuring mechanism configured to measure a viscosity of the powder resin flowing in the housing portion; and a control portion configured to judge whether or not the powder resin is in a state in which an estimate of a bulk density of the powder resin flowing in the housing portion is less than or equal to a bulk density permissible value, the estimate being obtainable from a correlation, calculated in advance, between the bulk density and a viscosity of the powder resin flowing in the housing portion, and a measured value of the viscosity obtained by the viscosity measuring mechanism.

In the present invention, it is possible to inspect the flowability of the powder resin by estimating the bulk density in the housing portion from the viscosity of the powder resin flowing in the housing portion which can be measured with relative ease. That is, unlike a case where the bulk density in the housing portion is directly measured, it is possible to inspect the flowability of the powder resin easily and efficiently without performing complicated steps such as taking the powder resin out of the housing portion and measuring the weight thereof.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3A is an enlarged view of the welded portions to which the powder resin is yet to be made to adhere and FIG. 3B is an enlarged view of the welded portions to which the powder resin was made to adhere;

FIG. 5 is a plan view of the housing portion, which explains the flow of the powder resin in a circumferential direction of the housing portion in the flow tank;

DESCRIPTION OF THE PREFERRED EMBODIMENTS

Figure 1:
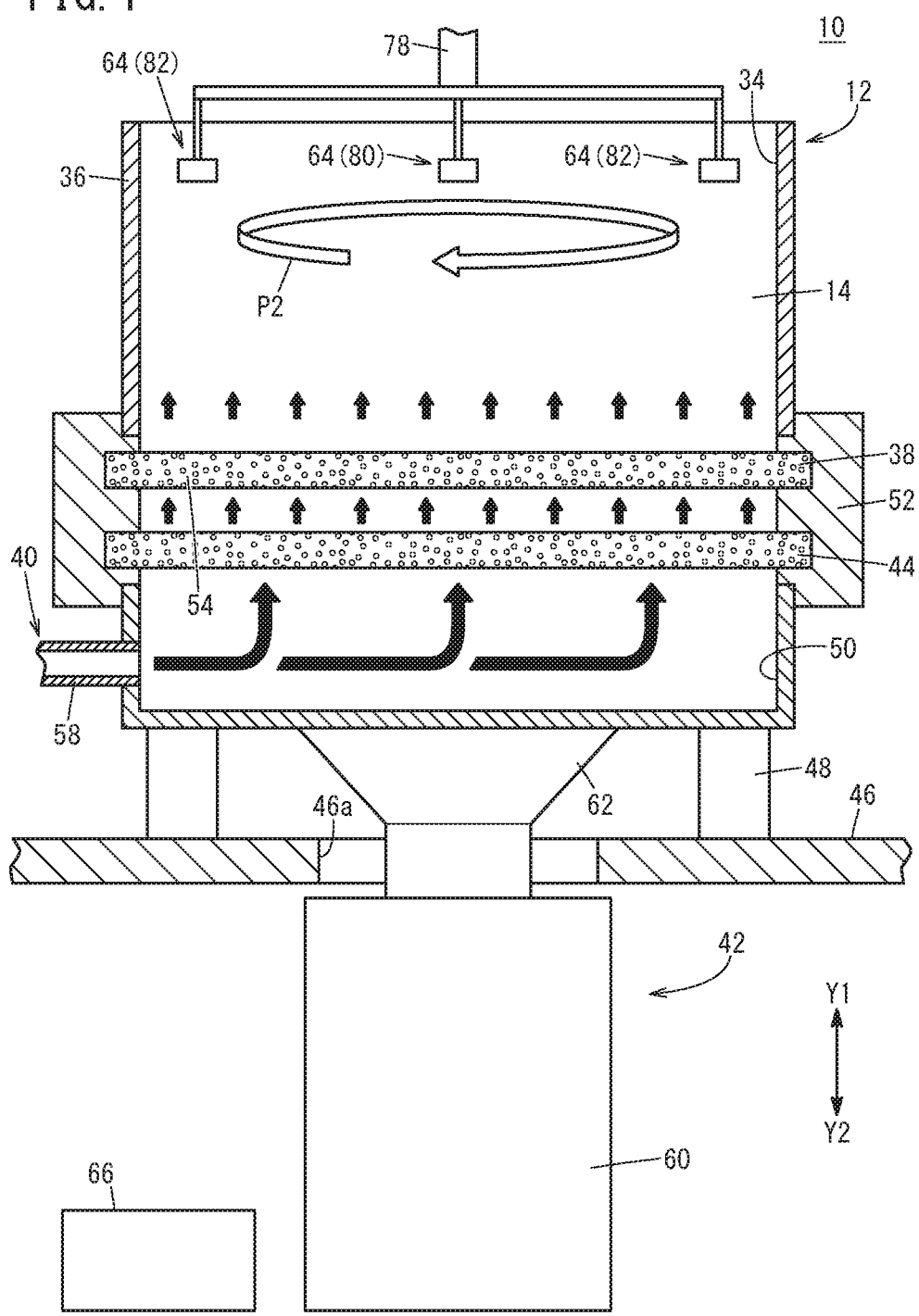
FIG. 1 is a schematic sectional view of a flow tank in which a powder resin flow inspection apparatus according to an embodiment of the present invention is set.

A preferred embodiment of a powder resin flow inspection method and a powder resin flow inspection apparatus 10 according to the present invention will be described in detail with reference to the accompanying drawings. In the following drawings, constituent elements having the same or similar function and effect are identified with the same reference character and overlapping explanations are sometimes omitted.

As shown in FIG. 1, the powder resin flow inspection apparatus 10 (hereinafter also referred to simply as the flow inspection apparatus 10) according to the present embodiment inspects the flow of powder resin 14 in a flow tank 12. The flow tank 12 makes the powder resin 14 flow, the powder resin being made to adhere to, for example, a portion to be coated of a heated workpiece. Suitable examples of the workpiece include a stator 16 shown in FIGS. 2 to 3B. Thus, first, the stator 16 will be briefly explained.

Figure 2:
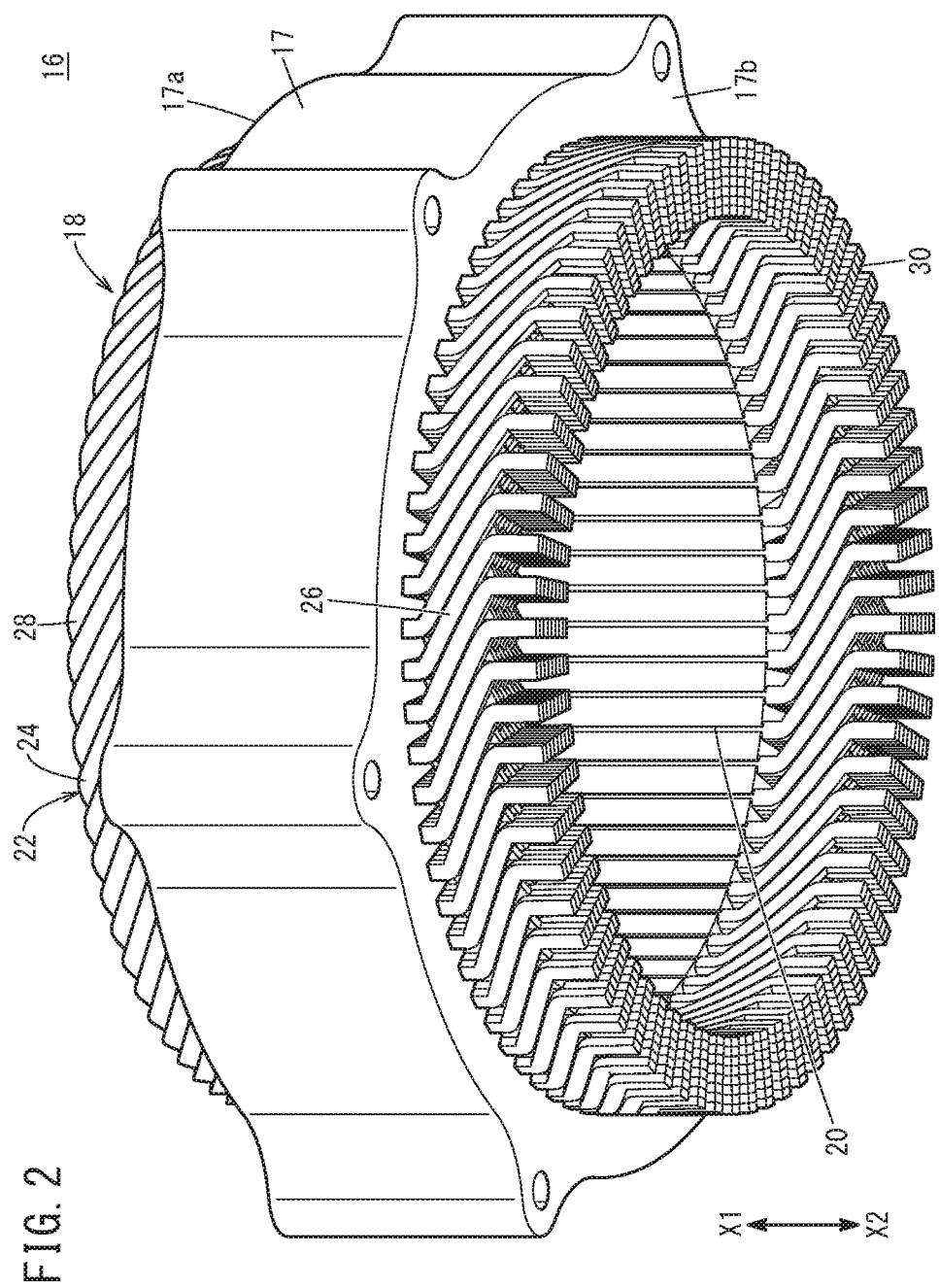
FIG. 2 is a perspective view of a stator with welded portions to which powder resin is made to adhere, the powder resin being made to flow by the flow tank of FIG. 1.

The stator 16 and an unillustrated rotor make up a rotating electric machine, which is used as an electric motor or generator, for example. Moreover, as shown in FIG. 2, the stator 16 includes a cylindrical core 17 and a coil 18. In the following description, each constituent element of the stator 16 will be explained with reference to the axial direction (an arrow X1-X2 direction in FIG. 2), the radial direction, and the circumferential direction of the core 17.

The core 17 is made up of, for example, a plurality of ring-shaped metal plates (which are not shown in the drawing) stacked in the axial direction. Moreover, in the core 17, a plurality of slots 20 passing through the core 17 in the axial direction are provided so as to be spaced in the circumferential direction. The coil 18 is made up of a plurality of segment groups 22 circularly arranged in the circumferential direction of the core 17. Each segment group 22 is formed by arranging a predetermined number of segments 24, each being formed by curving an electrical conductor, in parallel in the radial direction.

Each segment 24 includes a pair of legs 26 and a curved portion 28 that connects the legs 26 at the base end side (the arrow X1 side in FIG. 2). The pair of legs 26 of each segment 24 are inserted through different slots 20 from the side (the arrow X1 side in FIG. 2) of the core 17 where one end face 17a thereof is located and protrude from the side (the arrow X2 side in FIG. 2) of the core 17 where another end face 17b thereof is located.

A tip portion of the leg 26 protruding from one of the slots 20 is welded to a tip portion of another leg 26 protruding from another slot 20 and, at each welded spot, a welded portion 30 is formed. The segments 24 are connected to one another via these welded portions 30 and thereby make up the coil 18.

As described above, since the plurality of segment groups 22 are circularly arranged in the circumferential direction of the core 17, the welded portions 30 are also circularly arranged on the side of the core 17 where the other end face 17b thereof is located. These welded portions 30 are coated with an insulating resin layer 32 shown in FIG. 3B so as to be electrically insulated from the other rotating electric machine elements and the like.

The flow tank 12 shown in FIG. 1 can be suitably applied to a case where powder coating is performed to provide the insulating resin layer 32 (FIG. 3B) to portions to be coated, which are the plurality of welded portions 30 (FIG. 2) circularly arranged on the stator 16 (FIG. 2) which is a workpiece. That is, in the flow tank 12, the welded portions 30 heated in advance are immersed in the powder resin 14 which is powder insulating resin flowing in a housing portion 34. This causes the powder resin 14, which has contacted the welded portions 30, to adhere (to be melted and stick) thereto by heat, and the insulating resin layer 32 is thereby formed. In addition to the stator 16 and the welded portions 30, the flow tank 12 can also perform powder coating on other workpieces and other portions to be coated.

The flow tank 12 includes a main body portion 36 in which the housing portion 34 housing the powder resin 14 is provided, a porous plate 38, an air supply mechanism 40, a vibrating mechanism 42, a dispersion plate 44, a supporting plate 46, and a rubber member 48. The main body portion 36 is, for example, a closed-end cylinder with an opening at an upper end, and the inside thereof is divided into an upper part and a lower part by the porous plate 38 and the dispersion plate 44 which are placed in the axial middle of the main body portion 36. As a result, in the upper part (on the arrow Y1 side in FIG. 1) of the inside of the main body portion 36, the housing portion 34 in the form of a closed-end cylinder which has an opening at an upper end and the bottom of which is the porous plate 38 is provided. Moreover, in the main body portion 36, a supply chamber 50 to which air is supplied from the air supply mechanism 40 is provided below the housing portion 34 (on the arrow Y2 side in FIG. 1).

The porous plate 38 and the dispersion plate 44 are fixed to the main body portion 36 via a fixing member 52. Moreover, the fixing member 52 supports the porous plate 38 and the dispersion plate 44 in such a way that the porous plate 38 is placed above the dispersion plate 44 so as to be separated therefrom with a predetermined space left therebetween. The porous plate 38 is configured to allow the air to pass therethrough while preventing the powder resin 14 from passing therethrough and is made of a porous material, for example. The dispersion plate 44 is made of a porous material that allows the air supplied to the supply chamber 50 to pass therethrough and disperses the air. The flow tank 12 may not be provided with the dispersion plate 44.

The air supplied to the supply chamber 50 from the air supply mechanism 40 is dispersed by passing through the pores of the dispersion plate 44 and moves toward the porous plate 38 in the dispersed state, and is supplied to the inside of the housing portion 34 by passing through the pores of the porous plate 38. In the porous plate 38, at least a portion (hereinafter also referred to as a bottom forming portion 54) that forms the bottom of the housing portion 34 is circular when viewed in the axial direction of the main body portion 36 (an arrow Y1-Y2 direction).

The air supply mechanism 40 includes an unillustrated air pump and a supply pipe 58 that guides the air taken in by the air pump to the supply chamber 50. The vibrating mechanism 42 vibrates the housing portion 34 in an axial direction, in a radial direction, and in a circumferential direction. Specifically, the vibrating mechanism 42 includes a vibrating motor 60 and a vibration transmitting portion 62 that transmits the vibrations produced by the vibrating motor 60. The vibrating motor 60 is placed below the supporting plate 46 placed below the main body portion 36. The vibration transmitting portion 62 extends upward from the vibrating motor 60, passes through a through hole 46a provided in the supporting plate 46, and is connected to substantially the radial center of the bottom of the main body portion 36.

On the bottom of the main body portion 36, a portion thereof closer to the periphery side than a portion to which the vibration transmitting portion 62 is connected and the supporting plate 46 are fixed with the rubber member 48 interposed therebetween. This allows the main body portion 36 to vibrate relative to the supporting plate 46.

That is, in the flow tank 12, by housing the powder resin 14 in the housing portion 34, supplying air to the inside of the housing portion 34 through the pores of the porous plate 38 by the air supply mechanism 40, and vibrating the housing portion 34 by the vibrating mechanism 42, the powder resin 14 can be made to flow in the housing portion 34.

Figure 4:
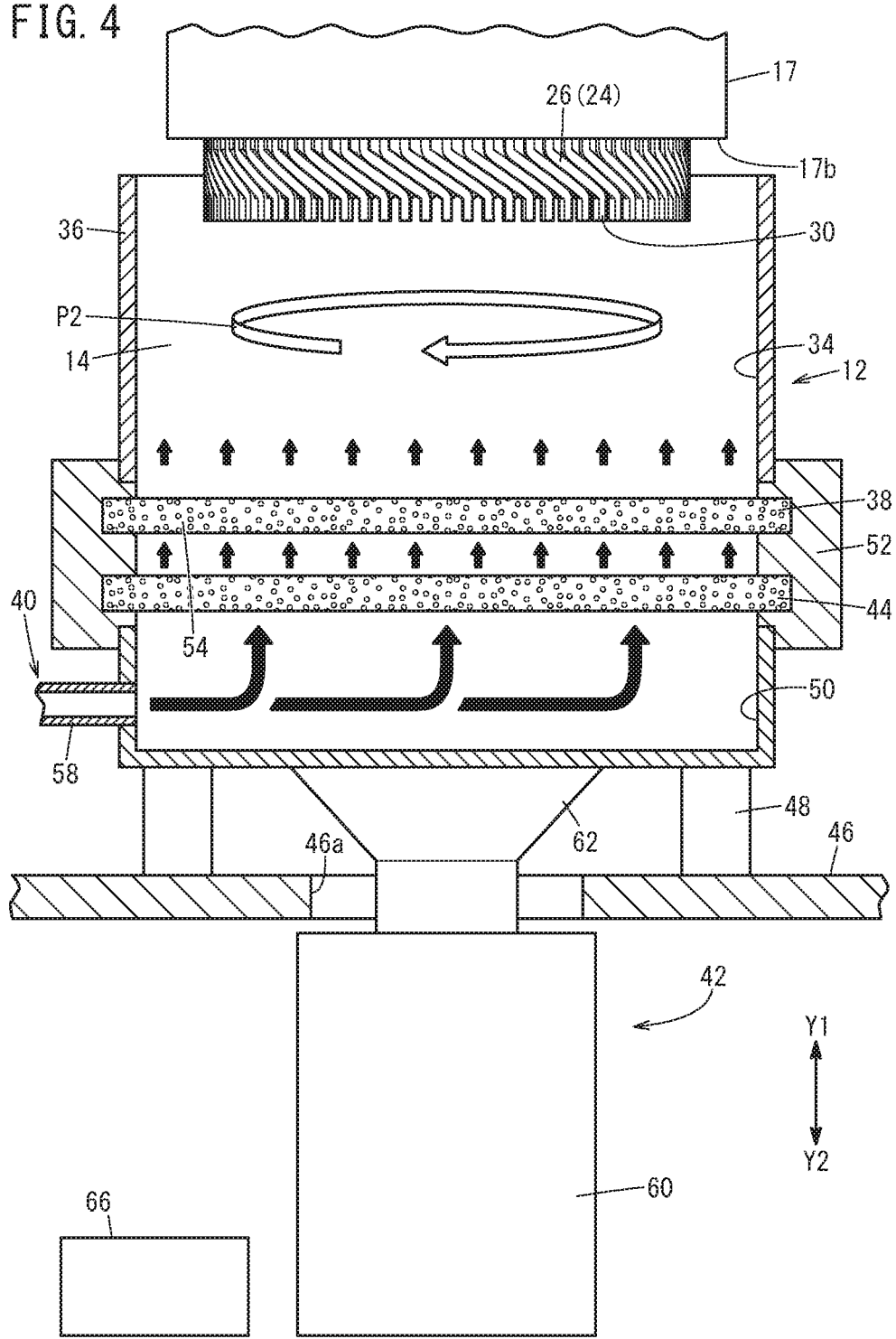
FIG. 4 is an explanatory diagram explaining how the welded portions of the stator are immersed in a housing portion of the flow tank of FIG. 1.

As shown in FIG. 4, the welded portions 30 of the stator 16 preheated by an unillustrated preheating furnace, for example, are immersed in the powder resin 14 flowing in the housing portion 34 by using an unillustrated supporting member or conveying equipment. This causes the powder resin 14 to be melted and stick to the welded portions 30 and the insulating resin layer 32 is thereby formed as shown in FIG. 3B.

As described above, in the flow tank 12, the heated welded portions 30 are immersed in the powder resin 14 flowing in the housing portion 34. Thus, due to, for instance, conduction of heat of the welded portions 30 to the powder resin 14 which has not yet adhered to the welded portions 30, the powder resin 14 is sometimes melted and powders of the powder resin stick to each other and a particle size thereby increases. When an increase in the particle size of the powder resin 14 causes the bulk density of the powder resin 14 in the housing portion 34 to rise and exceed a bulk density permissible value, the flowability of the powder resin 14 relative to the amount of air supplied to the housing portion 34 decreases, which may make it difficult to perform powder coating efficiently and perform powder coating of high quality.

The bulk density permissible value here can be, for example, a maximum value of the bulk density at which powder coating of high quality can be efficiently performed, and is a value that is determined in advance by an experiment or the like using the flow tank 12 and the stator 16. That is, to make it possible to perform powder coating satisfactorily in the flow tank 12, it is preferable to maintain the bulk density of the powder resin 14 in the housing portion 34 at or below the bulk density permissible value.

Moreover, it has been confirmed that, in the flow tank 12, when the housing portion 34 is vibrated in the above-described manner, the magnitudes of the amplitude and acceleration of radial and circumferential vibrations observed on the radial center side of the housing portion 34 are substantially the same as those observed on the periphery side of the housing portion 34. On the other hand, it has been confirmed that the amplitude and acceleration of axial (the arrow Y1-Y2 direction in FIG. 1) vibrations of the housing portion 34 increase toward the periphery side of the housing portion 34 with distance from the radial center side thereof.

As described above, on the periphery side in the housing portion 34 where the amplitude and the like of axial vibrations are large, the powder resin 14 is struck against the porous plate 38 and the pores are clogged more easily than those on the radial center side. In a part where the porous plate 38 is clogged, the amount of air supplied to the inside of the housing portion 34 through the porous plate 38 is decreased. This makes it more difficult for the powder resin 14 on the periphery side of the bottom forming portion 54 of the housing portion 34 to flow than the powder resin 14 on the radial center side, and, as indicated by arrows P1 in FIGS. 6A and 6B, the radial flow of the powder resin 14 moving toward the periphery side from the radial center side is produced.

On the other hand, when clogging or the like has not occurred in the porous plate 38 and air is supplied to the inside of the housing portion 34 from the entire bottom forming portion 54 of the porous plate 38, it is possible to make the powder resin 14 flow in the circumferential direction of the housing portion 34 as indicated by arrows P2 in FIGS. 1 and 5. In this case, unlike a case where the welded portions 30 are immersed in the radially flowing powder resin 14 shown in FIGS. 6A and 6B, it is possible to prevent an excessive amount of powder resin 14 from being melted and sticking to the inside diameter side of each welded portion 30 and prevent a shortage of the powder resin 14 which is melted and sticks to the outside diameter side of each welded portion 30. Moreover, it is possible to make the powder resin 14 adhere to the entire area of each welded portion 30 satisfactorily by making the powder resin 14 satisfactorily reach even a small space between the legs 26 which form the welded portion 30.

That is, in the flow tank 12, in order to prevent powder coating from being performed in a state in which the porous plate 38 is clogged, it is preferable that a judgment on whether or not the periphery side of the bottom forming portion 54 of the porous plate 38 is clogged can be made, in other words, a judgment on whether or not the powder resin 14 in the housing portion 34 is flowing radially can be made.

The flow inspection apparatus 10 according to the present embodiment inspects the flow of the powder resin 14 in the housing portion 34 so that the bulk density of the powder resin 14 in the housing portion 34 can be maintained at or below the bulk density permissible value. Moreover, by inspecting the flow of the powder resin 14 in the housing portion 34, whether or not the periphery side of the bottom forming portion 54 of the porous plate 38 is clogged is judged.

Figure 7:
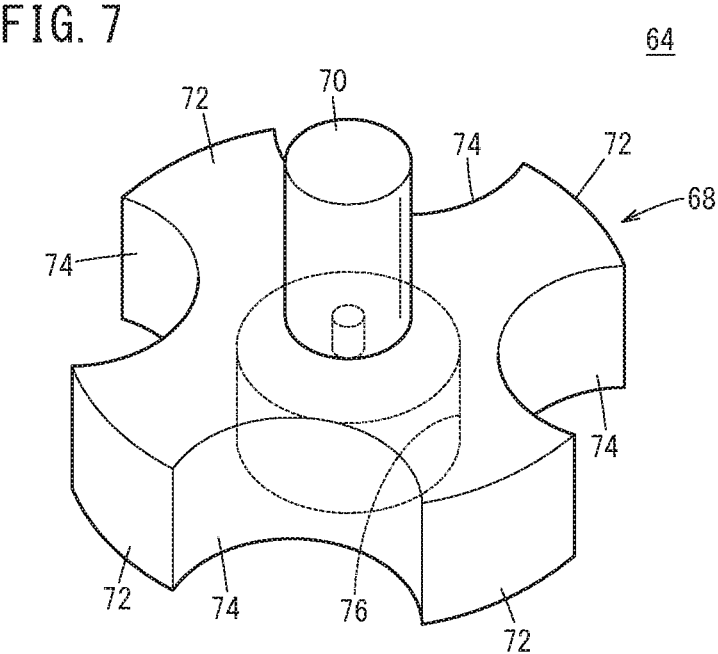
FIG. 7 is a schematic perspective view of principal portions of a viscosity measuring mechanism.

Specifically, as shown in FIG. 1, the flow inspection apparatus 10 includes a viscosity measuring mechanism 64 that measures the viscosity of the powder resin 14 flowing in the housing portion 34, and a control portion 66 to which the measured value obtained by the viscosity measuring mechanism 64 is input. As shown in FIG. 7, the viscosity measuring mechanism 64 includes a measuring portion 68, a transmission shaft 70, and an unillustrated calculating portion. The calculating portion may be provided in the control portion 66.

The measuring portion 68 is provided with a plurality of vanes 72 and rotates by the vanes 72 receiving the pressure of the powder resin 14 flowing in the housing portion 34 of FIG. 1. In the present embodiment, a cylinder is provided with, at regular intervals in the circumferential direction thereof, four cutouts 74 extending in the axial direction of the cylinder, and each part between the adjacent cutouts 74 forms the vane 72. That is, a total of four vanes 72 are provided in the measuring portion 68.

Each cutout 74 is arc-shaped when viewed in a plan view. Moreover, a closed-end hole 76 is provided at the radial center of the measuring portion 68, and the transmission shaft 70 is fixed by being passed through the bottom of the closed-end hole 76. The transmission shaft 70 transmits the rotation of the measuring portion 68 to the calculating portion. The calculating portion calculates, from the rotation of the measuring portion 68 transmitted via the transmission shaft 70, the viscosity of the powder resin 14 in an area in the housing portion 34 where the measuring portion 68 is placed.

As shown in FIG. 5, in the present embodiment, by being hung from, for example, a hanging jig 78 (FIG. 1), the measuring portions 68 are provided in locations on the radial center side and the periphery side in the housing portion 34. In the following description, the measuring portion 68 which is placed on the radial center side of the housing portion 34 is also referred to as a center-side measuring portion 80, the measuring portion 68 which is placed on the periphery side is also referred to as a periphery-side measuring portion 82, and these center-side measuring portion 80 and periphery-side measuring portion 82 are also referred to collectively as the measuring portions 68. Moreover, the viscosity of the powder resin 14 flowing on the center side of the housing portion 34 is also referred to as the center-side viscosity, the viscosity of the powder resin 14 flowing on the periphery side is also referred to as the periphery-side viscosity, and these center-side viscosity and periphery-side viscosity are also referred to collectively and simply as the viscosity.

In the present embodiment, in order to improve the accuracy of measurement of the viscosity in the housing portion 34, as shown in FIG. 5, a plurality of the periphery-side measuring portions 82 are provided in the circumferential direction of the housing portion 34 with a predetermined space left therebetween. In this case, the periphery-side viscosity which is measured by the viscosity measuring mechanism 64 is the mean value of the measured values obtained by the periphery-side measuring portions 82. Moreover, it is preferable that, when powder coating is actually performed by immersing the welded portions 30 in the powder resin 14 flowing in the housing portion 34, the measuring portions 68 are placed in areas in the housing portion 34 where the welded portions 30 are placed in the axial direction in the housing portion 34 as shown in FIG. 4.

Figure 8:
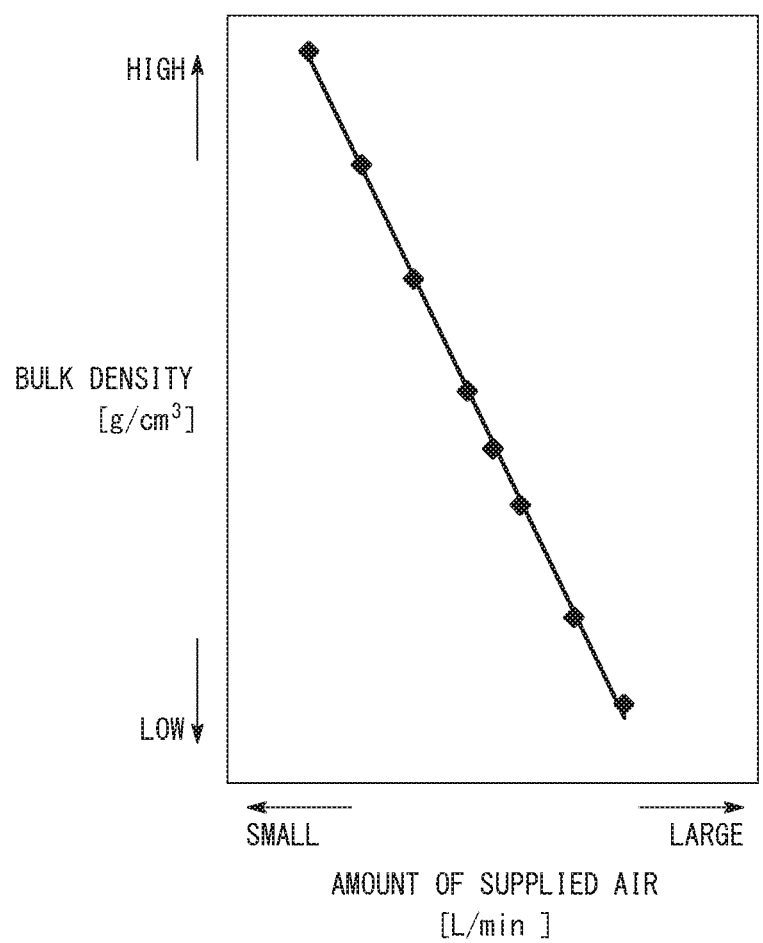
FIG. 8 is a graph showing a correlation between the amount of air supplied to the inside of the housing portion and the bulk density of the powder resin flowing in the housing portion.

There is a correlation, which is shown in FIG. 8, between the bulk density of the powder resin 14 flowing in the housing portion 34 and the amount of air supplied to the inside of the housing portion 34. That is, the bulk density of the powder resin 14 varies in accordance with the amount of air supplied to the inside of the housing portion 34, and the bulk density tends to decrease with an increase in the amount of supplied air.

Figure 9:
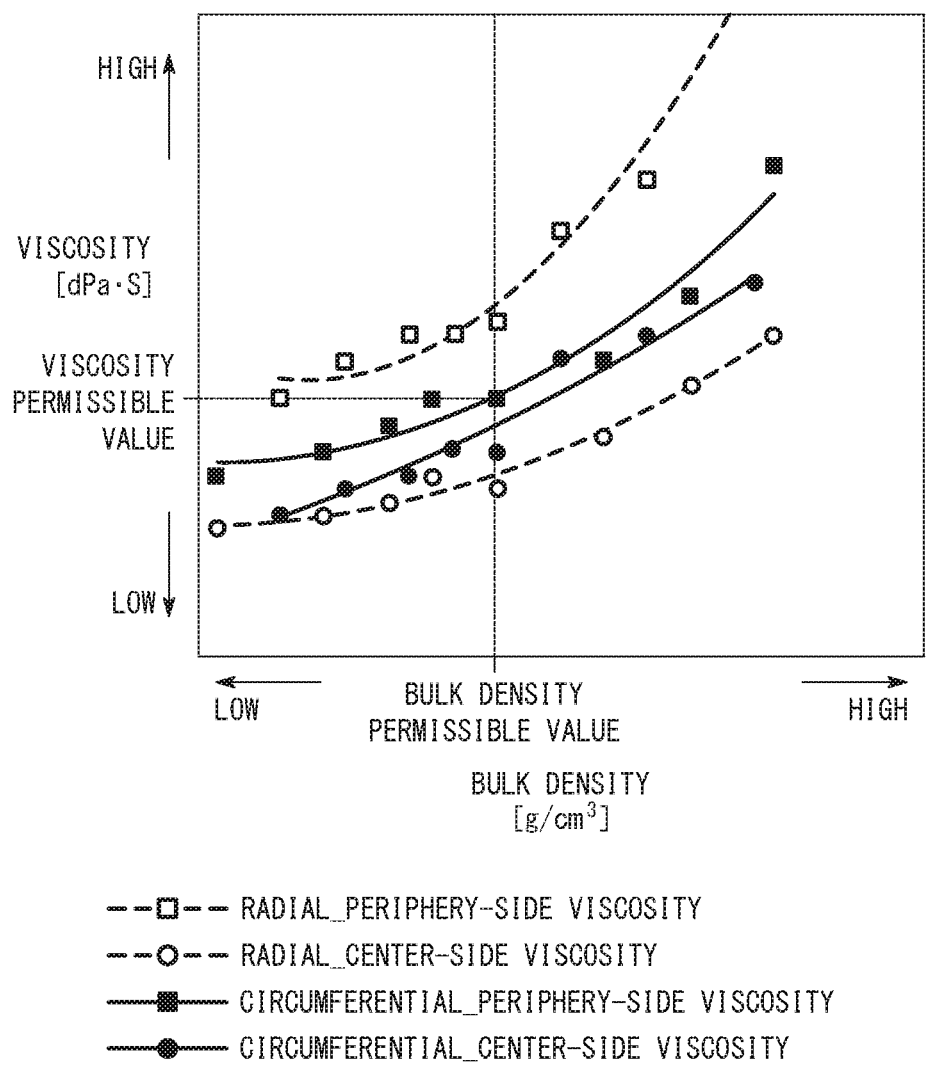
FIG. 9 is a graph showing, for the powder resin flowing in a circumferential direction, a correlation between the bulk density and the center-side viscosity and a correlation between the bulk density and the periphery-side viscosity and, for the powder resin flowing radially, a correlation between the bulk density and the center-side viscosity and a correlation between the bulk density and the periphery-side viscosity.

Moreover, as shown in FIG. 9, there is a correlation between the bulk density and the viscosity of the powder resin 14 flowing in the housing portion 34, and it is possible to determine this correlation by measuring the viscosity while varying the bulk density in the housing portion 34 by varying the amount of air supplied to the housing portion 34.

Figure 10:
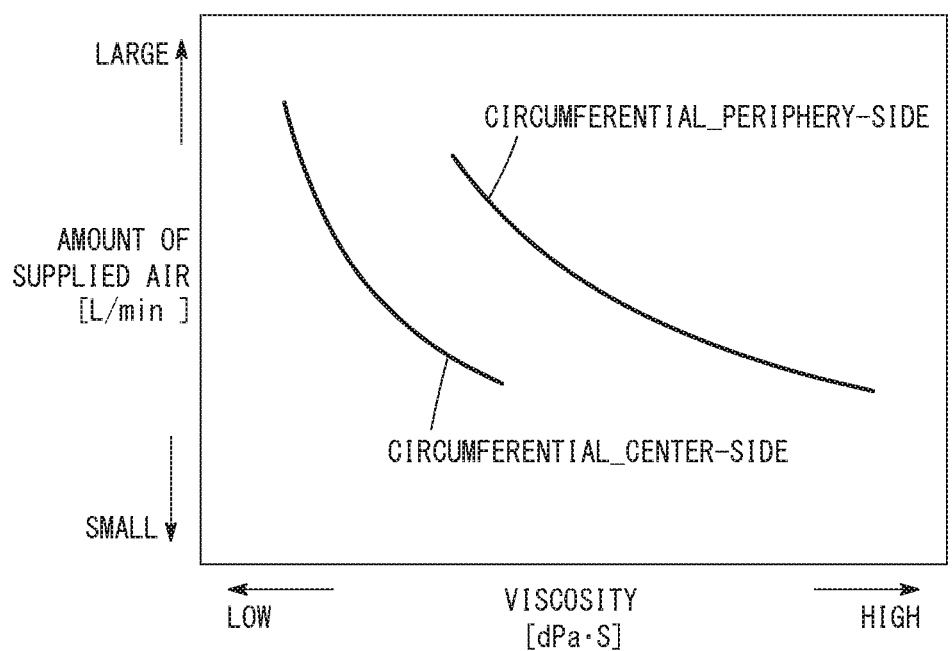
FIG. 10 is a graph showing a correlation between the amount of air supplied to the inside of the housing portion and each of the center-side viscosity and the periphery-side viscosity of the powder resin flowing in the circumferential direction.

Further, as shown in FIG. 10, it is possible to determine the correlation between the viscosity and the amount of supplied air from the correlation between the bulk density and the amount of supplied air shown in FIG. 8 and from the correlation between the bulk density and the viscosity shown in FIG. 9, for example. Specifically, there is also a correlation between the viscosity of the powder resin 14 flowing in the housing portion 34 and the amount of air supplied to the inside of the housing portion 34. The correlation between the viscosity and the amount of supplied air shown in FIG. 10 may be directly determined by measuring the viscosity while varying the amount of air supplied to the inside of the housing portion 34, without using the correlations shown in FIGS. 8 and 9.

From the correlation between the bulk density and the viscosity calculated in advance and shown in FIG. 9, it is possible to use, as an estimate of the bulk density the bulk density corresponding to the measured value of the viscosity obtained by the viscosity measuring mechanism 64. The control portion 66 judges whether or not the powder resin 14 flowing in the housing portion 34 is in a state in which the estimate of the bulk density is less than or equal to the bulk density permissible value.

At this time, the control portion 66 may judge whether or not an estimate of the bulk density is less than or equal to the bulk density permissible value by making a comparison between the bulk density permissible value and an estimate of the bulk density actually calculated from the correlation shown in FIG. 9 and from the measured value of the viscosity.

Instead, the control portion 66 may determine, from the correlation shown in FIG. 9, a viscosity corresponding to the bulk density permissible value as a viscosity permissible value, and judge whether or not the measured value of the viscosity is less than or equal to the viscosity permissible value by making a comparison between the measured value of the viscosity and the viscosity permissible value. In this manner, also by making a comparison between the measured value of the viscosity and the viscosity permissible value, it is possible to judge whether or not the powder resin 14 flowing in the housing portion 34 is in a state in which the estimate of the bulk density is less than or equal to the bulk density permissible value. Moreover, the viscosity permissible value may be directly determined by performing an experiment or the like using the flow tank 12 and the stator 16 as in the case of the bulk density permissible value, without using the correlation shown in FIG. 9.

When judging that the estimate of the bulk density is greater than the bulk density permissible value, the control portion 66 adjusts the amount of air supplied by the air supply mechanism 40 so that the estimate of the bulk density is less than or equal to the bulk density permissible value, based on the correlation between the amount of supplied air and the bulk density shown in FIG. 8. Alternatively, when judging that the measured value of the viscosity is greater than the viscosity permissible value, the control portion 66 adjusts the amount of air supplied by the air supply mechanism 40 so that the measured value of the viscosity is less than or equal to the viscosity permissible value, based on the correlation between the viscosity and the amount of supplied air shown in FIG. 10.

As a result, it becomes possible to maintain the bulk density of the powder resin 14 in the housing portion 34 at or below the bulk density permissible value. Specifically, the control portion 66 may actually determine an estimate of the bulk density from the correlation shown in FIG. 9 and from the measured value of the viscosity, and adjust the amount of supplied air so that the estimate of the bulk density is less than or equal to the bulk density permissible value. Further, the control portion 66 may maintain the bulk density at or below the bulk density permissible value by adjusting the amount of supplied air based on a comparison between the measured value of the viscosity and the viscosity permissible value, without actually determining an estimate of the bulk density.

In the present embodiment, as shown in FIG. 4, when the welded portions 30 are immersed in the powder resin 14 flowing in the housing portion 34, the welded portions 30 are placed on the periphery side of the housing portion 34. Therefore, when the control portion 66 actually determines an estimate of the bulk density, it is preferable to determine the estimate of the bulk density from the measured value of the periphery-side viscosity obtained by the periphery-side measuring portions 82 and the correlation between the bulk density and the viscosity shown in FIG. 9.

Moreover, when the control portion 66 determines a viscosity permissible value from the correlation shown in FIG. 9, it is preferable to determine the viscosity permissible value from the periphery-side viscosity corresponding to the bulk density permissible value in the correlation shown in FIG. 9. Further, when adjusting the amount of supplied air based on the correlation shown in FIG. 10, it is preferable to adjust the amount of supplied air so that the measured value of the periphery-side viscosity is less than or equal to the viscosity permissible value.

There is a possibility that, even by adjusting the amount of supplied air, the bulk density in the housing portion 34 becomes too high to be adjusted to be less than or equal to the bulk density permissible value. Thus, if the control portion 66 judges that the estimate of the bulk density is greater than the bulk density permissible value, the control portion 66 may further make a comparison between the estimate of the bulk density and a bulk density limit value before adjusting the amount of supplied air in the above-described manner, for example. Then, if the estimate of the bulk density is greater than the bulk density limit value, the control portion 66 may judge that it is time to replace the powder resin 14 in the housing portion 34.

Moreover, also when the control portion 66 judges that the measured value of the viscosity is greater than the viscosity permissible value, the control portion 66 may make a comparison between the measured value of the viscosity and a viscosity limit value before adjusting the amount of supplied air, for example. Then, if the measured value of the viscosity is greater than the viscosity limit value, the control portion 66 may judge that it is time to replace the powder resin 14 in the housing portion 34.

As described above, if the control portion 66 judges that it is time to replace the powder resin 14, it is possible to make the bulk density in the housing portion 34 less than or equal to the bulk density permissible value by, for example, replacing the powder resin 14 in the housing portion 34 with new powder resin 14 whose bulk density has not yet risen. In other words, it is possible to make the viscosity of the powder resin in the housing portion 34 less than or equal to the viscosity permissible value. Further, when it is judged that it is time to replace the powder resin 14, the amount of supplied air may be adjusted so that the flowability is temporality secured.

On the other hand, if the estimate of the bulk density is less than or equal to the bulk density limit value, the amount of supplied air may be adjusted as described above so that the estimate of the bulk density is less than or equal to the bulk density permissible value. Alternatively, if the measured value of the viscosity is less than or equal to the viscosity limit value, the amount of supplied air may be adjusted as described above so that the measured value of the viscosity is less than or equal to the viscosity permissible value.

The bulk density limit value can be determined in advance by an experiment or the like using the powder resin 14 and the flow tank 12. By using the correlation shown in FIG. 9, a viscosity corresponding to the bulk density limit value can be determined as the viscosity limit value. Further, the viscosity limit value may be directly determined by an experiment or the like using the powder resin 14 and the flow tank 12, without using the correlation shown in FIG. 9.

In the flow tank 12, the amplitude and the like of axial vibrations are large on the periphery side of the housing portion 34 as described above. For this reason, in the housing portion 34, the bulk density of the powder resin 14 on the bottom side rises more easily on the periphery side than on the radial center side. Thus, the closer to the bottom side of the housing portion 34 and the closer to the periphery side of the housing portion 34, the higher the viscosity of the powder resin 14 in the housing portion 34.

Figure 6A:
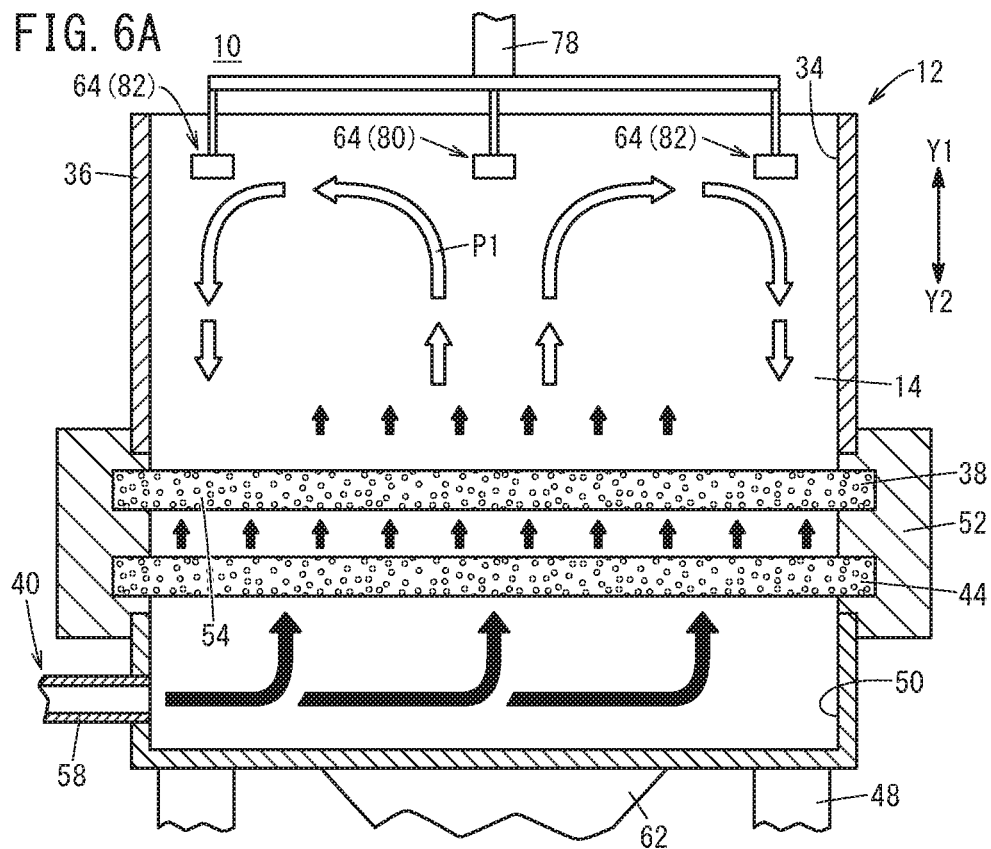
FIG. 6A is a schematic sectional view of principal portions, which explains the radial flow of the powder resin in the housing portion.
Figure 6B:
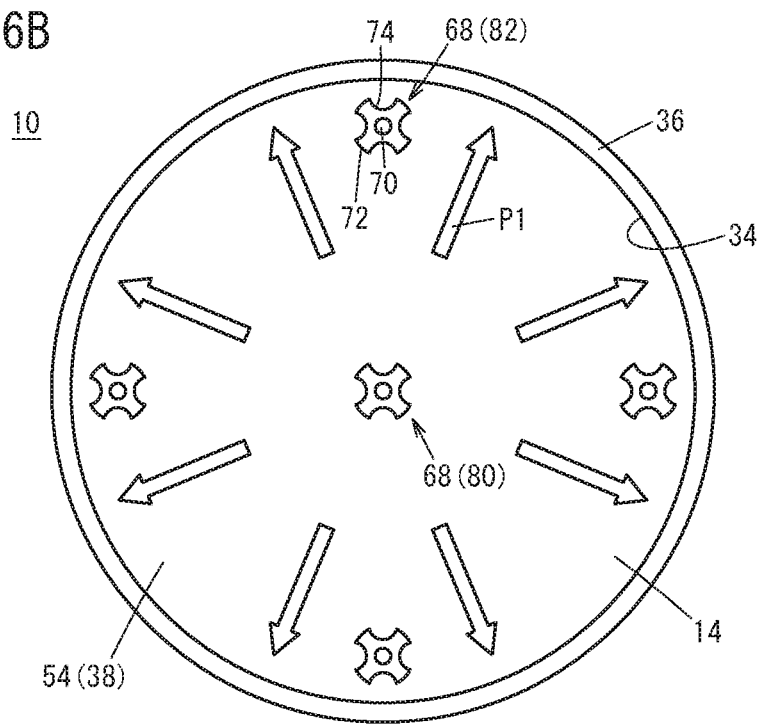
FIG. 6B is a plan view of the housing portion of FIG. 6A.

That is, as shown in FIG. 9, the periphery-side viscosity which is obtained by the periphery-side measuring portions 82 tends to be higher than the center-side viscosity which is obtained by the center-side measuring portion 80. In particular, a viscosity difference between the center-side viscosity and the periphery-side viscosity which is observed when the powder resin 14 is flowing radially as indicated by the arrows P1 in FIGS. 6A and 6B is greater than that observed when the powder resin 14 is flowing in the circumferential direction as indicated by the arrows P2 in FIGS. 1 and 5 (see FIGS. 9 and 11).

Figure 11:
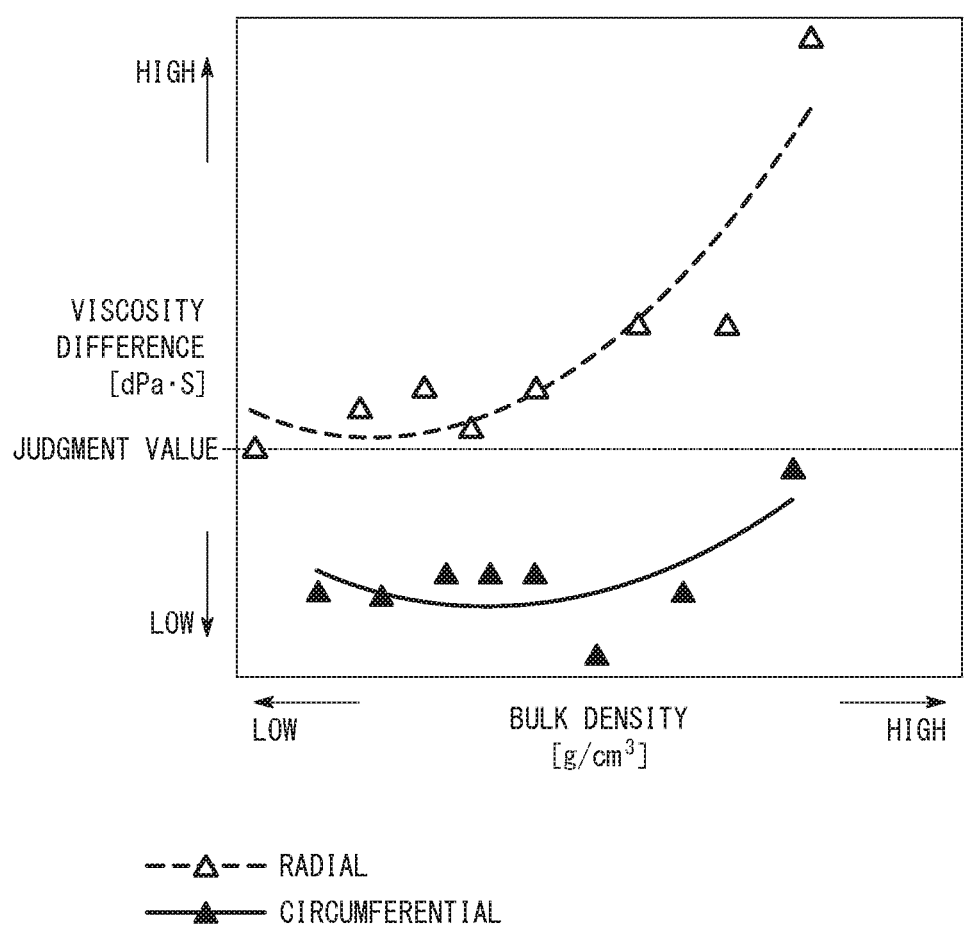
FIG. 11 is a graph explaining a viscosity difference between the center-side viscosity and the periphery-side viscosity of the powder resin flowing in the circumferential direction of FIG. 9 and a viscosity difference between the center-side viscosity and the periphery-side viscosity of the powder resin flowing radially.

It is clear from FIG. 11 that the powder resin 14 flows radially when a viscosity difference between the center-side viscosity and the periphery-side viscosity is greater than or equal to a judgment value. Thus, the control portion 66 determines a viscosity difference from the measured value of the center-side viscosity obtained by the center-side measuring portion 80 and the measured value of the periphery-side viscosity obtained by the periphery-side measuring portions 82 and makes a comparison between the viscosity difference and the judgment value.

Then, if the viscosity difference is greater than or equal to the judgment value, the control portion 66 judges that the powder resin 14 is flowing radially, in other words, clogging has occurred on the periphery side of the porous plate 38. In this case, for example, by replacing the porous plate 38 judged to have clogging with a new porous plate 38 in which no clogging has occurred, it is possible to make the powder resin 14 flow in the circumferential direction in the housing portion 34.

Figure 12:
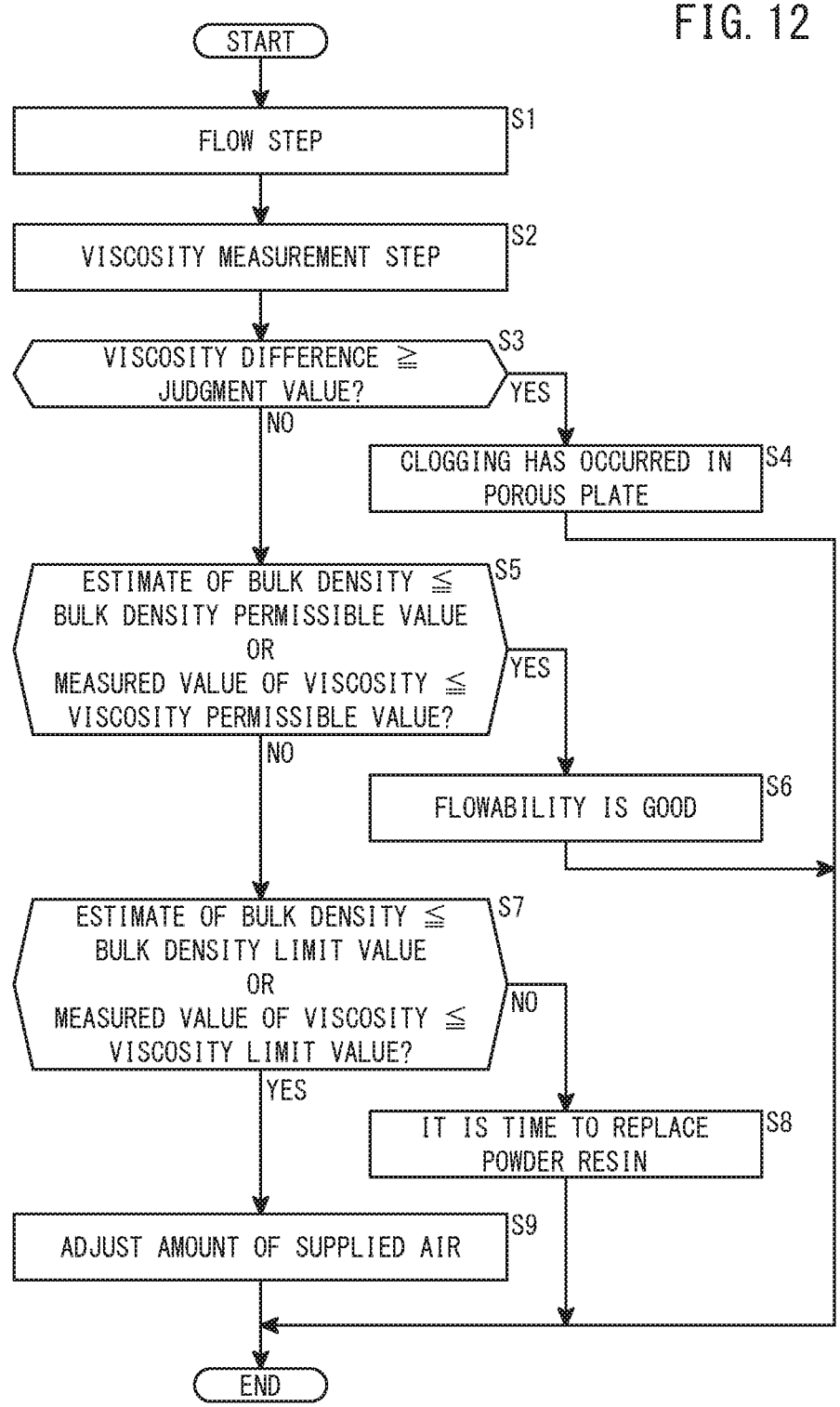
FIG. 12 is a flowchart explaining an example of a powder resin flow inspection method according to the embodiment of the present invention.

The flow inspection apparatus 10 according to the present embodiment is basically configured as described above. The flow inspection method according to the present embodiment will be described with reference mainly to FIGS. 1 and 12 by taking up, as an example, a case where the flow inspection method is performed using the flow inspection apparatus 10. This flow inspection method is performed in a state in which, for example, powder coating on the welded portions 30 of the stator 16 is suspended and the welded portions 30 are not immersed in the powder resin 14 flowing in the housing portion 34, and conducts an inspection to check whether or not the powder resin 14 in the housing portion 34 is in a flow state suitable for powder coating.

Specifically, in the flow inspection method, a flow step (Step S1) of housing the powder resin 14 in the housing portion 34 of the flow tank 12 and making the powder resin 14 flow by supplying air to the inside of the housing portion 34 through the pores of the porous plate 38 provided in the bottom of the housing portion 34 and vibrating the housing portion 34 is performed. Before or after this flow step, the center-side measuring portion 80 and the periphery-side measuring portions 82 supported on the hanging jig 78, for example, are provided in locations on the radial center side and the periphery side, respectively, in the housing portion 34.

Next, a viscosity measurement step (Step S2) of measuring the viscosity of the powder resin 14 flowing in the housing portion 34 by the viscosity measuring mechanism 64 is performed. In the viscosity measurement step, the center-side viscosity is measured by the center-side measuring portion 80 and the periphery-side viscosity is measured by the periphery-side measuring portions 82.

Next, a clogging judgment step of determining, from the center-side viscosity and the periphery-side viscosity obtained in the viscosity measurement step, a viscosity difference between the center-side viscosity and the periphery-side viscosity and making a comparison between the viscosity difference and the judgment value is performed (Step S3). If the viscosity difference is greater than or equal to the judgment value in the clogging judgment step (Step S3: YES), the procedure proceeds to Step S4, in which it is judged that clogging has occurred on the periphery side of the bottom forming portion 54 of the porous plate 38.

On the other hand, if the viscosity difference is less than the judgment value in the clogging judgment step (Step S3: NO), the procedure proceeds to Step S5, in which a judgment step is performed. In the judgment step, a judgment is made on whether or not an estimate of the bulk density, which is determined from the correlation between the bulk density and the viscosity calculated in advance and shown in FIG. 9 and the measured value of the periphery-side viscosity obtained in the viscosity measurement step (Step S2), is less than or equal to the bulk density permissible value. Alternatively, in the judgment step, a judgment is made on whether or not a measured value of the viscosity (periphery-side viscosity) obtained in the viscosity measurement step (Step S2) is less than or equal to the viscosity permissible value.

In the judgment step, if the estimate of the bulk density is judged to be less than or equal to the bulk density permissible value, or if the measured value of the viscosity is judged to be less than or equal to the viscosity permissible value (Step S5: YES), the procedure proceeds to Step S6. Then it is judged that the powder resin 14 in the housing portion 34 is in a flow state suitable for satisfactorily performing powder coating, that is, the flowability of the powder resin 14 is good, and the flowchart according to the present embodiment is ended.

In the judgment step, if the estimate of the bulk density is judged to be greater than the bulk density permissible value, or if the measured value of the viscosity is judged to be greater than the viscosity permissible value (Step S5: NO), the procedure proceeds to Step S7. In Step S7, a comparison between the estimate of the bulk density and the bulk density limit value, or a comparison between the measured value of the viscosity and the viscosity limit value is made by the control portion 66. Then, if the estimate of the bulk density is greater than the bulk density limit value, or if the measured value of the viscosity is greater than the viscosity limit value (Step S7: NO), the procedure proceeds to Step S8. Then it is judged that it is time to replace the powder resin 14, and the flowchart according to the present embodiment is ended.

If the estimate of the bulk density is less than or equal to the bulk density limit value, or if the measured value of the viscosity is less than or equal to the viscosity limit value (Step S7: YES), the procedure proceeds to Step S9. Then the amount of air supplied by the air supply mechanism 40 is adjusted so that the estimate of the bulk density is less than or equal to the bulk density permissible value, based on the correlation between the amount of supplied air and the bulk density shown in FIG. 8. Alternatively, the amount of air supplied by the air supply mechanism 40 is adjusted so that the measured value of the viscosity is less than or equal to the viscosity permissible value, based on the correlation between the viscosity and the amount of supplied air shown in FIG. 10. Thereafter, the flowchart according to the present embodiment is ended.

As described above, with the flow inspection method and the flow inspection apparatus 10 according to the present embodiment, it is possible to inspect the flowability of the powder resin 14 by estimating the bulk density in the housing portion 34 from the viscosity of the powder resin 14 flowing in the housing portion 34 which can be measured with relative ease. That is, unlike a case where the bulk density in the housing portion 34 is directly measured, it is possible to inspect the flowability of the powder resin 14 easily and efficiently without performing complicated steps such as taking the powder resin 14 out of the housing portion 34 and measuring the weight thereof.

In the judgment step of the flow inspection method according to the above-described embodiment, the estimate of the bulk density may be determined from the correlation between the bulk density and the viscosity and from the measured value of the viscosity, and whether or not the estimate of the bulk density is less than or equal to the bulk density permissible value may be judged by comparing the estimate and the bulk density permissible value. If the estimate of the bulk density is judged to be greater than the bulk density permissible value in the judgment step, the amount of supplied air may be adjusted so that the estimate of the bulk density is less than or equal to the bulk density permissible value, based on the correlation between the amount of air supplied to the inside of the housing portion 34 and the bulk density.

Moreover, in the flow inspection apparatus 10 according to the above-described embodiment, the control portion 66 may determine an estimate of the bulk density from the correlation between the bulk density and the viscosity and from the measured value of the viscosity, and compare the estimate and the bulk density permissible value. If the control portion 66 judges that the estimate of the bulk density is greater than the bulk density permissible value, the control portion 66 may adjust the amount of supplied air so that the estimate of the bulk density is less than or equal to the bulk density permissible value, based on the correlation between the amount of air supplied to the inside of the housing portion 34 and the bulk density.

In the judgment step of the flow inspection method according to the above-described embodiment, the measured value of the viscosity may be compared with a viscosity permissible value of the viscosity corresponding to the bulk density permissible value to judge whether or not the measured value of the viscosity is less than or equal to the viscosity permissible value, and in the judgment step, if the measured value of the viscosity is judged to be greater than the viscosity permissible value, an amount of air supplied to the inside of the housing portion may be adjusted so that the measured value of the viscosity is less than or equal to the viscosity permissible value, based on a correlation, calculated in advance, between the amount of supplied air and the viscosity.

Moreover, in the flow inspection apparatus according to the above-described embodiment, the control portion may compare the measured value of the viscosity with a viscosity permissible value of the viscosity corresponding to the bulk density permissible value, and if the control portion judges that the measured value of the viscosity is greater than the viscosity permissible value, the control portion may adjust an amount of air supplied to the inside of the housing portion so that the measured value of the viscosity is less than or equal to the viscosity permissible value, based on a correlation between the amount of supplied air and the viscosity.

As described above, by adjusting the bulk density of the powder resin 14 in the housing portion 34 by adjusting the amount of air supplied to the inside of the housing portion 34 based on the result of an inspection of the flow of the powder resin 14 performed by the flow inspection method and the flow inspection apparatus 10, it is possible to make the powder resin 14 adhere to the entire area of each welded portion 30 efficiently and satisfactorily, that is, perform powder coating satisfactorily.

In the flow inspection method according to the above-described embodiment, if the estimate of the bulk density is judged to be greater than the bulk density permissible value in the judgment step, the estimate of the bulk density may be compared with the bulk density limit value, which is greater than the bulk density permissible value, and if the estimate of the bulk density is greater than the bulk density limit value, it may be judged that it is time to replace the powder resin 14.

Moreover, in the flow inspection apparatus 10 according to the above-described embodiment, if the control portion 66 judges that the estimate of the bulk density is greater than the bulk density permissible value, the control portion 66 may compare the estimate of the bulk density with the bulk density limit value, which is greater than the bulk density permissible value, and if the estimate of the bulk density is greater than the bulk density limit value, the control portion 66 may judge that it is time to replace the powder resin 14.

In the flow inspection method according to the above-described embodiment, in the judgment step, if the measured value of the viscosity is judged to be greater than the viscosity permissible value, the measured value of the viscosity may be compared with a viscosity limit value, which is greater than the viscosity permissible value, and if the measured value of the viscosity is greater than the viscosity limit value, it may be judged that it is time to replace the powder resin.

Moreover, in the flow inspection apparatus according to the above-described embodiment, if the control portion judges that the measured value of the viscosity is greater than the viscosity permissible value, the control portion may compare the measured value of the viscosity with a viscosity limit value, which is greater than the viscosity permissible value, and if the measured value of the viscosity is greater than the viscosity limit value, the control portion may judge that it is time to replace the powder resin.

With the flow inspection method and the flow inspection apparatus 10 according to the present embodiment, it is possible to judge whether it is time to replace the powder resin 14 as described above. This makes it possible to maintain the bulk density of the powder resin 14 flowing in the housing portion 34 at or below the bulk density permissible value by, for example, replacing the powder resin 14 in the housing portion 34 with new powder resin 14 whose particle size has not yet increased in accordance with the judgment result. This makes it possible to perform powder coating on the welded portions 30 satisfactorily. Note that a configuration may be adopted in which neither a comparison between the estimate of the bulk density and the bulk density limit value nor a comparison between the measured value of the viscosity and the viscosity limit value is made by the control portion 66.

In the flow inspection method according to the above-described embodiment, the housing portion 34 has the form of a closed-end cylinder with an opening at one end, in the viscosity measurement step, the center-side viscosity of the powder resin 14 flowing on the radial center side of the housing portion 34 and the periphery-side viscosity of the powder resin 14 flowing on the periphery side of the housing portion 34 are measured, and the flow inspection method includes a clogging judgment step of comparing, before or after the judgment step, a viscosity difference between the center-side viscosity and the periphery-side viscosity with the judgment value, and judging that the periphery side of the porous plate 38 is clogged if the viscosity difference is greater than or equal to the judgment value.

Moreover, in the flow inspection apparatus 10 according to the above-described embodiment, the housing portion 34 has the form of a closed-end cylinder with an opening at one end, the viscosity measuring mechanism 64 measures the center-side viscosity of the powder resin 14 flowing on the radial center side of the housing portion 34 and the periphery-side viscosity of the powder resin 14 flowing on the periphery side of the housing portion 34, and the control portion 66 compares a viscosity difference between the center-side viscosity and the periphery-side viscosity with the judgment value, and judges that the periphery side of the porous plate 38 is clogged if the viscosity difference is greater than or equal to the judgment value.

If clogging has occurred on the periphery side of the porous plate 38, it is difficult to adjust the bulk density of the powder resin 14 in the housing portion 34 by adjusting the amount of supplied air. Moreover, clogging that has occurred on the periphery side of the porous plate 38 allows the powder resin 14 to easily flow radially. If the circularly arranged welded portions 30 are immersed in the radially flowing powder resin 14, an excessive amount of powder resin 14 adheres to the inside diameter side of each welded portion 30 or an insufficient amount of powder resin 14 adheres to the outside diameter side of each welded portion 30, for example, which may make it difficult to make the powder resin 14 to adhere to the entire area of each welded portion 30 satisfactorily.

With the flow inspection method and the flow inspection apparatus 10 of the present embodiment, since it is possible to judge whether clogging has occurred in the porous plate 38 as described above, the porous plate 38 can be replaced with a porous plate 38 in which no clogging has occurred, for example, in accordance with the judgment result. This makes it possible to adjust the bulk density in the housing portion 34 satisfactorily and make the powder resin 14 flow in the circumferential direction by avoiding the radial flow of the powder resin 14 in the housing portion 34. As a result, it is possible to perform powder coating satisfactorily on the welded portions 30.

In the flow inspection method of the above-described embodiment, the clogging judgment step is performed before the judgment step; alternatively, the clogging judgment step may be performed after the judgment step.

In the flow inspection apparatus 10 according to the above-described embodiment, the viscosity measuring mechanism 64 includes the measuring portion 68 provided with the plurality of vanes 72, and measures the viscosity of the powder resin 14 by rotation of the measuring portion 68 caused by the vanes 72 receiving the pressure of the powder resin 14 flowing in the housing portion 34.

The viscosity measuring mechanism 64 structured as described above makes it possible to locally measure the viscosity of the powder resin 14 in the housing portion 34 and measure the viscosity in a relatively low viscosity range as compared with, for example, a common rotational viscometer or the like that reads drag (viscous drag), which is exerted on a rotating body (which is not shown in the drawing) by the powder resin 14 flowing in the housing portion 34, from the rotary torque thereof or the like. This makes it possible to inspect the flow in the flow tank 12 with a higher degree of accuracy.

The present invention is not limited to the above-described embodiment and various modifications can be made thereto without departing from the scope of the present invention.

For example, in the above-described embodiment, the measuring portions 68 are respectively placed on the radial center side and the periphery side of the housing portion 34 in an upper part thereof. However, for instance, when an estimate of the bulk density is determined, the measuring portions 68 may be provided in any locations in the housing portion 34 and the number of measuring portions 68 which are provided is not limited.

What is claimed is:

1. A powder resin flow inspection method for inspecting a flow of powder resin in a flow tank configured to make the powder resin flow, the powder resin being made to adhere to a portion to be coated of a heated workpiece, the powder resin flow inspection method comprising:
    a flow step of housing the powder resin in a housing portion of the flow tank and making the powder resin flow by supplying air to an inside of the housing portion through pores of a porous plate provided in a bottom of the housing portion and vibrating the housing portion;
    a viscosity measurement step of measuring a viscosity of the powder resin flowing in the housing portion; and
    a judgment step of judging whether or not the powder resin is in a state in which an estimate of a bulk density of the powder resin flowing in the housing portion is less than or equal to a bulk density permissible value, the estimate being obtainable from a correlation, calculated in advance, between the bulk density and the viscosity of the powder resin flowing in the housing portion, and a measured value of the viscosity obtained in the viscosity measurement step; and
    based on the judgement step, adjusting an amount of air supplied to the inside of the housing portion so that subsequent estimates of the bulk density is less than or equal to the bulk density permissible value.

2. The powder resin flow inspection method according to claim 1, wherein
    in the judgment step, the estimate of the bulk density is determined from the correlation between the bulk density and the viscosity and from the measured value of the viscosity, and whether or not the estimate of the bulk density is less than or equal to the bulk density permissible value is judged by comparing the estimate and the bulk density permissible value, and
    if the estimate of the bulk density is judged to be greater than the bulk density permissible value in the judgment step, an amount of air supplied to the inside of the housing portion is adjusted so that the subsequent estimates of the bulk density is less than or equal to the bulk density permissible value, based on a correlation between the amount of supplied air and the bulk density.

3. The powder resin flow inspection method according to claim 2, wherein
    if the estimate of the bulk density is judged to be greater than the bulk density permissible value in the judgment step, the estimate of the bulk density is compared with a bulk density limit value, which is greater than the bulk density permissible value, and if the estimate of the bulk density is greater than the bulk density limit value, replace the powder resin.

4. The powder resin flow inspection method according to claim 1, wherein
    in the judgment step, the measured value of the viscosity is compared with a viscosity permissible value of the viscosity corresponding to the bulk density permissible value to judge whether or not the measured value of the viscosity is less than or equal to the viscosity permissible value, and
    if the measured value of the viscosity is judged to be greater than the viscosity permissible value in the judgment step, an amount of air supplied to the inside of the housing portion is adjusted so that subsequent measured values of the viscosity is less than or equal to the viscosity permissible value, based on a correlation, calculated in advance, between the amount of supplied air and the viscosity.

5. The powder resin flow inspection method according to claim 4, wherein
    if the measured value of the viscosity is judged to be greater than the viscosity permissible value in the judgment step, the measured value of the viscosity is compared with a viscosity limit value, which is greater than the viscosity permissible value, and if the measured value of the viscosity is greater than the viscosity limit value, replace the powder resin.

6. The powder resin flow inspection method according to claim 1, wherein
    the housing portion has a form of a closed-end cylinder with an opening at one end,
    in the viscosity measurement step, a center-side viscosity of the powder resin flowing on a radial center side of the housing portion and a periphery-side viscosity of the powder resin flowing on a periphery side of the housing portion are measured, and the powder resin flow inspection method further comprises a clogging judgment step of comparing, before or after the judgment step, a viscosity difference between the center-side viscosity and the periphery-side viscosity with a judgment value, and judging that a periphery side of the porous plate is clogged if the viscosity difference is greater than or equal to the judgment value.

7. A powder resin flow inspection apparatus that inspects a flow of powder resin in a flow tank configured to make the powder resin flow, the powder resin being made to adhere to a portion to be coated of a heated workpiece, wherein by supplying air to an inside of a housing portion configured to house the powder resin, through pores of a porous plate provided in a bottom of the housing portion and vibrating the housing portion, the flow tank makes the powder resin housed in the housing portion flow, and the powder resin flow inspection apparatus comprises:

a viscosity measuring mechanism configured to measure a viscosity of the powder resin flowing in the housing portion; and a control portion configured to judge whether or not the powder resin is in a state in which an estimate of a bulk density of the powder resin flowing in the housing portion is less than or equal to a bulk density permissible value, the estimate being obtainable from a correlation, calculated in advance, between the bulk density and the viscosity of the powder resin flowing in the housing portion, and a measured value of the viscosity obtained by the viscosity measuring mechanism, and wherein the control portion adjusts an amount of air supplied to the inside of the housing portion so that subsequent estimates of the bulk density is less than or equal to the bulk density permissible value.

8. The powder resin flow inspection apparatus according to claim 7, wherein the control portion determines the estimate of the bulk density from the correlation between the bulk density and the viscosity and from the measured value of the viscosity, and compares the estimate and the bulk density permissible value, and if the control portion judges that the estimate of the bulk density is greater than the bulk density permissible value, the control portion adjusts an amount of air supplied to the inside of the housing portion so that subsequent estimates of the bulk density is less than or equal to the bulk density permissible value, based on a correlation between the amount of supplied air and the bulk density.

9. The powder resin flow inspection apparatus according to claim 8, wherein if the control portion judges that the estimate of the bulk density is greater than the bulk density permissible value, the control portion compares the estimate of the bulk density with a bulk density limit value, which is greater than the bulk density permissible value, and if the estimate of the bulk density is greater than the bulk density limit value, the control portion replaces the powder resin.

10. The powder resin flow inspection apparatus according to claim 7, wherein the control portion compares the measured value of the viscosity with a viscosity permissible value of the viscosity corresponding to the bulk density permissible value, and if the control portion judges that the measured value of the viscosity is greater than the viscosity permissible value, the control portion adjusts an amount of air supplied to the inside of the housing portion so that subsequent measured values of the viscosity is less than or equal to the viscosity permissible value, based on a correlation between the amount of supplied air and the viscosity.

11. The powder resin flow inspection apparatus according to claim 10, wherein if the control portion judges that the measured value of the viscosity is greater than the viscosity permissible value, the control portion compares the measured value of the viscosity with a viscosity limit value, which is greater than the viscosity permissible value, and if the measured value of the viscosity is greater than the viscosity limit value, the control portion replaces the powder resin.

12. The powder resin flow inspection apparatus according to claim 7, wherein the housing portion has a form of a closed-end cylinder with an opening at one end, the viscosity measuring mechanism measures a center-side viscosity of the powder resin flowing on a radial center side of the housing portion and a periphery-side viscosity of the powder resin flowing on a periphery side of the housing portion, and the control portion compares a viscosity difference between the center-side viscosity and the periphery-side viscosity with a judgment value, and judges that a periphery side of the porous plate is clogged if the viscosity difference is greater than or equal to the judgment value.

13. The powder resin flow inspection apparatus according to claim 7, wherein the viscosity measuring mechanism includes a measuring portion provided with a plurality of vanes, and measures the viscosity of the powder resin by rotation of the measuring portion caused by the vanes receiving pressure of the powder resin flowing in the housing portion.

* * * * *